United States Patent [19]

Madison et al.

[11] Patent Number: 4,516,487
[45] Date of Patent: May 14, 1985

[54] APPARATUS FOR FOLDING A DOUGH SHEET TO ENCLOSE A FOODSTUFF FILLER

[76] Inventors: David P. Madison, 409 Glenbrook Rd., Apt. E, Stamford, Conn. 06906; Michael B. Cruver, 1408 Adams, Port Townsend, Wash. 98368

[21] Appl. No.: 375,051

[22] Filed: May 5, 1982

[51] Int. Cl.³ .......................... A21C 9/00; A21C 11/00
[52] U.S. Cl. .................................. 99/450.6; 99/450.2; 99/450.7
[58] Field of Search ........................... 99/450.1–450.8, 99/352–356; 53/465, 461, 216, 211, 210, 206; 229/87 R, 87 F; 426/410, 92, 94, 128, 129, 130, 138, 297, 282–284, 391, 414, 500–502, 725

[56] References Cited

U.S. PATENT DOCUMENTS

| | | | |
|---|---|---|---|
| 1,981,875 | 11/1934 | McDonald | 107/4 |
| 3,379,139 | 4/1968 | Lipinsky | 99/450.6 |
| 3,669,007 | 6/1972 | Pulici | 99/450.6 |
| 3,757,676 | 9/1973 | Pomara, Jr. | 99/450.6 |
| 3,912,433 | 10/1975 | Ma | 99/450.6 X |
| 3,946,656 | 3/1976 | Hai | 99/450.6 |
| 4,047,478 | 9/1977 | Taostmann et al. | 99/450.1 |
| 4,084,493 | 4/1978 | Quintana | 99/450.7 |
| 4,334,464 | 6/1982 | Shinriki | 99/450.6 |

FOREIGN PATENT DOCUMENTS

| | | | |
|---|---|---|---|
| 2025306 | 1/1980 | United Kingdom | 99/450.1 |
| 2059858 | 4/1981 | United Kingdom | 99/450.1 |

Primary Examiner—Timothy F. Simone
Attorney, Agent, or Firm—Robert W. Beach; Ward Brown

[57] ABSTRACT

A tortilla-folding machine has a series of four continuously traveling elevationally spaced belt conveyors for successively transporting a tortilla as it is being folded. Initially the leading portion of the tortilla carrying a foodstuff filler is supported beyond the discharge end of the first belt conveyor by a folding roller rotating in the same direction as the adjacent conveyor discharge end roller. As the filler approaches the nip between the folding roller and the adjacent conveyor belt roller, such folding roller is moved away from the conveyor belt and its direction of rotation is reversed. The counterrotating rollers draw the tortilla down between them to fold the tortilla under the foodstuff filler, propel the fold through the gap between such rollers and deposit the doubled tortilla onto a continuously traveling second belt conveyor with its opposite side portions overlying two quarter belts, respectively, which infold such opposite side portions over two cantilever rods. As the tortilla is transported by the second belt conveyor it is slid along such rods and over their free ends. At the discharge end of such conveyor an oscillating blade folder turns the doubled leading portion of the tortilla back onto the trailing portion behind the foodstuff filler and transfers the tortilla to the third belt conveyor. A second oscillating blade folder again folds the tortilla in similar manner and discharges it from the third belt conveyor.

16 Claims, 16 Drawing Figures

Fig. 4B.    STATION I

Fig. 4A.    STATION I

APPARATUS FOR FOLDING A DOUGH SHEET TO ENCLOSE A FOODSTUFF FILLER

BACKGROUND OF THE INVENTION

1. Field of the Invention

The present invention relates to envelopeforming apparatus for sequentially folding a thin sheet wrapper of dough, such as a tortilla, around a foodstuff filling so as to produce a burrito or similar food product.

2. Prior Art

The Quintana U.S. Pat. No. 4,084,493 proposed to solve the problem of producing stuffed, folded or rolled food products, such as burritos, with automatic equipment to reduce the high cost of manually producing the burritos and to insure a consistent quality of product. However, Quintana discloses complex apparatus in which a conveyor belt is periodically started and stopped, and which requires various synchronizing means to regulate the folding operations and the conveyor belt.

The Hai U.S. Pat. No. 3,946,656 discloses a machine for producing filled pastry rolls having foodstuff in an envelope covering but folding of the covering is accomplished at successive stations during dwells of the product instead of the product traveling continuously.

While the conveyor belts of the food-processing apparatus shown in Pomara U.S. Pat. No. 3,757,676 and McDonald U.S. Pat. No. 1,981,875 move continuously during processing of the product, the resultant product has only a doubled or single-folded covering as in a taco or turnover and such apparatus cannot produce a burrito having an envelope with several folds covering a foodstuff filling, or an enchilada or taquito with several folds or rolled layers covering a foodstuff filling.

The Pulici U.S. Pat. No. 3,669,007 shows another apparatus for producing a foodstuff-filled dough envelope, such as a burrito, but such apparatus includes a complex conveyor system having articulated platens.

SUMMARY OF THE INVENTION

It is the principal object of the present invention to provide an apparatus for producing in a continuous operation a food product including a foodstuff filling enclosed in a sheet wrapper or envelope of thin dough, such as burritos in which opposite sides of the wrapper are infolded as well as burritos having one or both ends open; taquitos and enchiladas in which the wrapper is folded or rolled and is open at both ends; and egg rolls or pastry rolls, as well as other types of products having an envelope or rolled wrapper or a wrapper having opposite infolded flaps.

It is a further object to provide transport apparatus for the product which transport apparatus will move continually without intermittent starting and stopping.

It also is an object to provide such an apparatus in which the various folding operations are performed independently of each other and are controlled by sensing the position of each individual product unit, therefore eliminating the need to maintain a constant interval between the successive product units.

Another object is to provide such an apparatus which is compact, simple to operate and easy to maintain in a sanitary condition, while being capable of folding sheet wrappers of varying sizes.

The foregoing objects can be accomplished by providing an apparatus including a plurality of elevationally spaced belt conveyors which travel continuously during the various folding operations and transport the product successively from each folding step to the next. The discharge portion of each preceding conveyor is spaced above and overlaps the feed portion of its succeeding conveyor.

A folding roller is spaced horizontally slightly from the discharge end of the first conveyor and is capable of both clockwise and counterclockwise rotation. Such folding roller rotates in the same direction as the adjacent roller of the first belt conveyor until filling on the central portion of a sheet wrapper is positioned above the nip of the folding roller and the adjacent first belt conveyor roller. Then the rotative direction of the folding roller is reversed, drawing the wrapper between the folding roller and the adjacent roller of the first belt conveyor onto the second belt conveyor. By such passage of the product between the two rollers, the leading portion of the wrapper is initially folded over the filler. As the tortilla wrapper is being thus initially folded a water gun sprays a fine spray of water onto the tortilla to glutinize the tortilla so that the contacting surfaces of the folds will adhere to each other.

As the doubled tortilla is carried by the second conveyor, the opposite side portions of the tortilla are infolded transversely of the initial fold over two cantilever rods onto the inner longitudinal portion of the tortilla by two quarter belts. As the thus folded tortilla reaches the end of the second conveyor, the folded leading portion is folded over onto the trailing flap of the tortilla by an oscillating blade folder as the tortilla is transferred to the third conveyor. When the tortilla reaches the end of the third conveyor, the leading portion is again folded over onto the trailing portion by a second oscillating blade folder.

DETAILED DESCRIPTION

Figure 1:
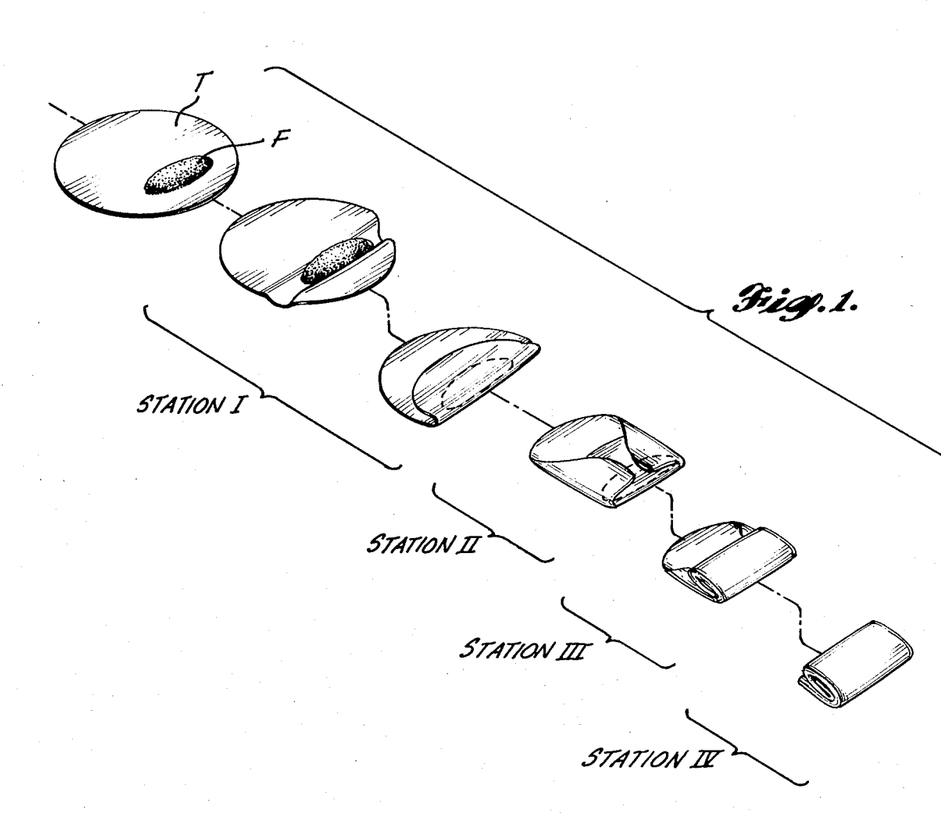
FIG. 1 is a schematic representation illustrating the progressive folding of a burrito by the apparatus of the present invention.

As shown schematically in FIG. 1, a tortilla T having a diameter from 9 inches (23 cm) to 16 inches (41 cm) is folded in envelope fashion as a wrapper around foodstuff filling F. The tortilla is first doubled and its portions at opposite sides of the fold are brought into contact around the foodstuff. Next, the opposite side portions of the tortilla are infolded transversely of the first fold, and finally the portion of the tortilla first folded is turned once or twice transversely of the infolds to complete an envelope around the foodstuff filling.

Figure 2:
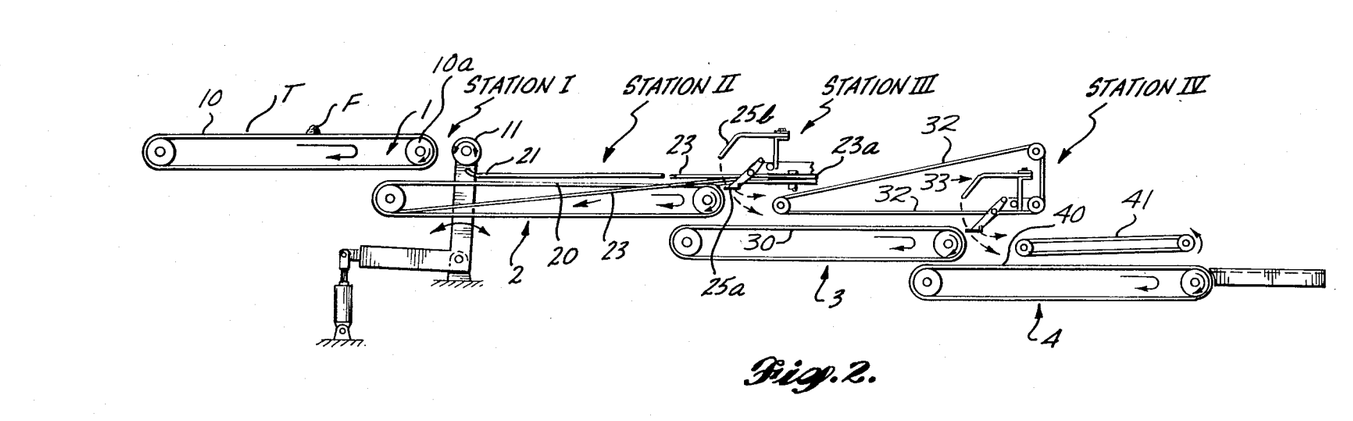
FIG. 2 is a diagrammatic elevation of the apparatus of the present invention.
Figure 3:
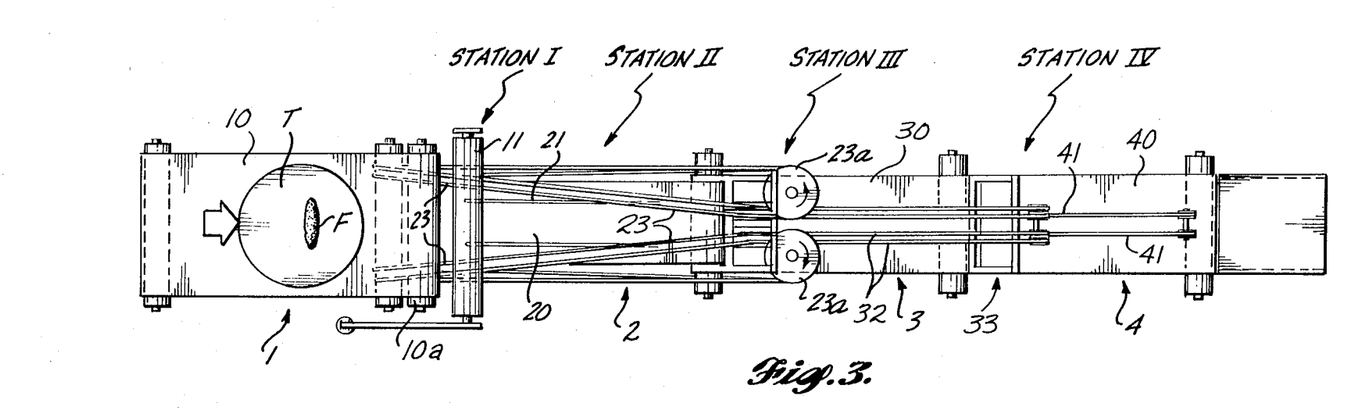
FIG. 3 is a diagrammatic plan of the apparatus.

Such folding operations occur sequentially at successive stations I, II, III and IV indicated in FIG. 1 by the apparatus shown diagrammatically in FIGS. 2 and 3. Such apparatus includes four belt conveyors, 1, 2, 3 and 4, arranged in series, each of which has a drive roller at its discharge end, an idler roller at its feed end and an endless conveyor belt encircling such rollers. FIG. 2 shows the conveyors positioned so that each succeeding conveyor is at a level lower than its preceding conveyor and the feed portion of each conveyor is positioned below the discharge portion of the preceding conveyor. Each conveyor belt is driven continuously during the folding operation so that the upper transport stretch 10, 20, 30, and 40 of each conveyor belt moves continuously from the feed end of its conveyor to the discharge end, from left to right, as seen in FIG. 2.

Figure 4A:
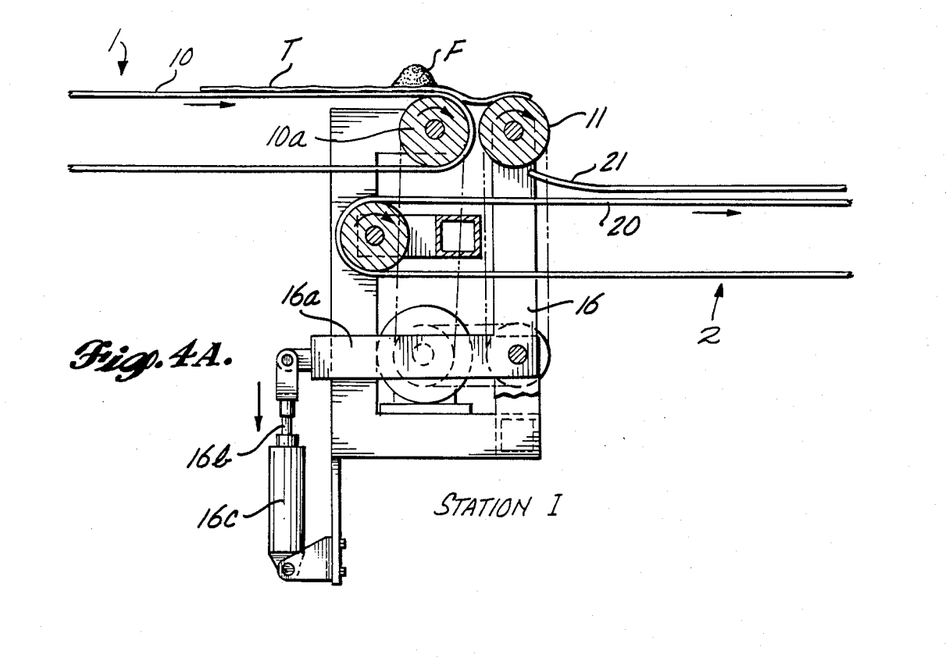
FIGS. 4A and 4B are diagrammatic elevations showing the operation of the folding roller of the apparatus.
Figure 4B:
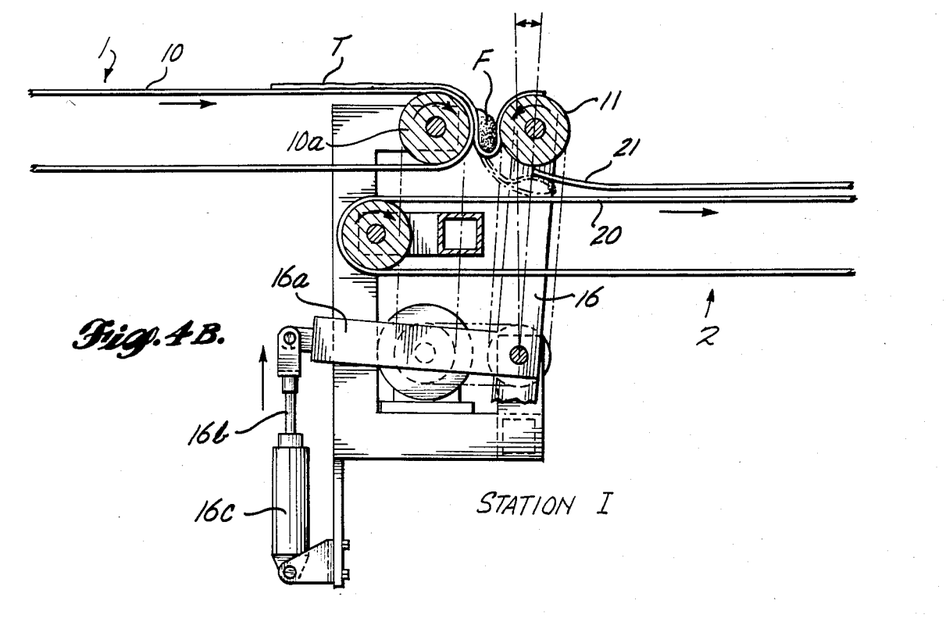

At station I, portrayed in FIGS. 4A and 4B, the tortilla sheet wrapper is initially folded under the foodstuff filling carried by it and the leading portion and the trailing portion of the wrapper are moved into overlapping engagement around the filling. To enable the foodstuff to be approximately centered over the fold, such foodstuff is placed on the wrapper at a distance about 7 to 7½ inches (18 to 19 cm) from the trailing edge of the tortilla, whatever the size of the tortilla. The wrapper-folding mechanism includes a reversibly rotatable auxiliary folding roller 11 located just beyond the discharge end roller 10a of the conveyor 1. Normally, the folding roller rotates in the same direction as the adjacent conveyor roller, shown as clockwise in FIG. 4A, and is disposed close to the conveyor roller 10 a so that as a wrapper carried by conveyor 1 reaches its discharge end, the leading edge of the wrapper will be propelled by the folding roller 11 up onto the crest of such roller.

When the trailing edge of the sheet wrapper passes through the beam of electric eye 18 a timer is activated. The timer is set so that as the foodstuff fillings approaches the discharge portion of conveyor 1, the direction in which roller 11 is driven is reversed, and such roller is shifted somewhat away from the adjacent conveyor belt pulley to increase the gap between the rollers 10a and 11 sufficient to enable the body of foodstuff on the tortilla to pass down between such rollers, although it may be compacted to some extent during such passage. On such reversal of rotation of folding roller 11, that roller and the adjacent roller 10 a of conveyor 1, rotating in opposite directions, will fold the tortilla and draw such fold and the foodstuff above the fold down between the rollers while simultaneously pressing together the portions of the tortilla above the nip of the rollers until the entire tortilla is doubled and passes between the rollers onto the second conveyor 2 with the leading portion of the tortilla folded back over the foodstuff filling and onto the trailing portion of the tortilla.

The folding roller 11 is rotated reversely for a time interval predetermined by the timer sufficient to assure that the tortilla has been drawn completely through the passage between the oppositely rotating rollers, whereupon the rotative direction of the folding roller 11 is again reversed to the same direction of rotation as the adjacent roller 10 a of the conveyor 1, and the folding roller is shifted toward the conveyor roller to narrow the gap between them for passage of the next tortilla over such gap between the conveyor 1 and the roller 11.

Figure 5:
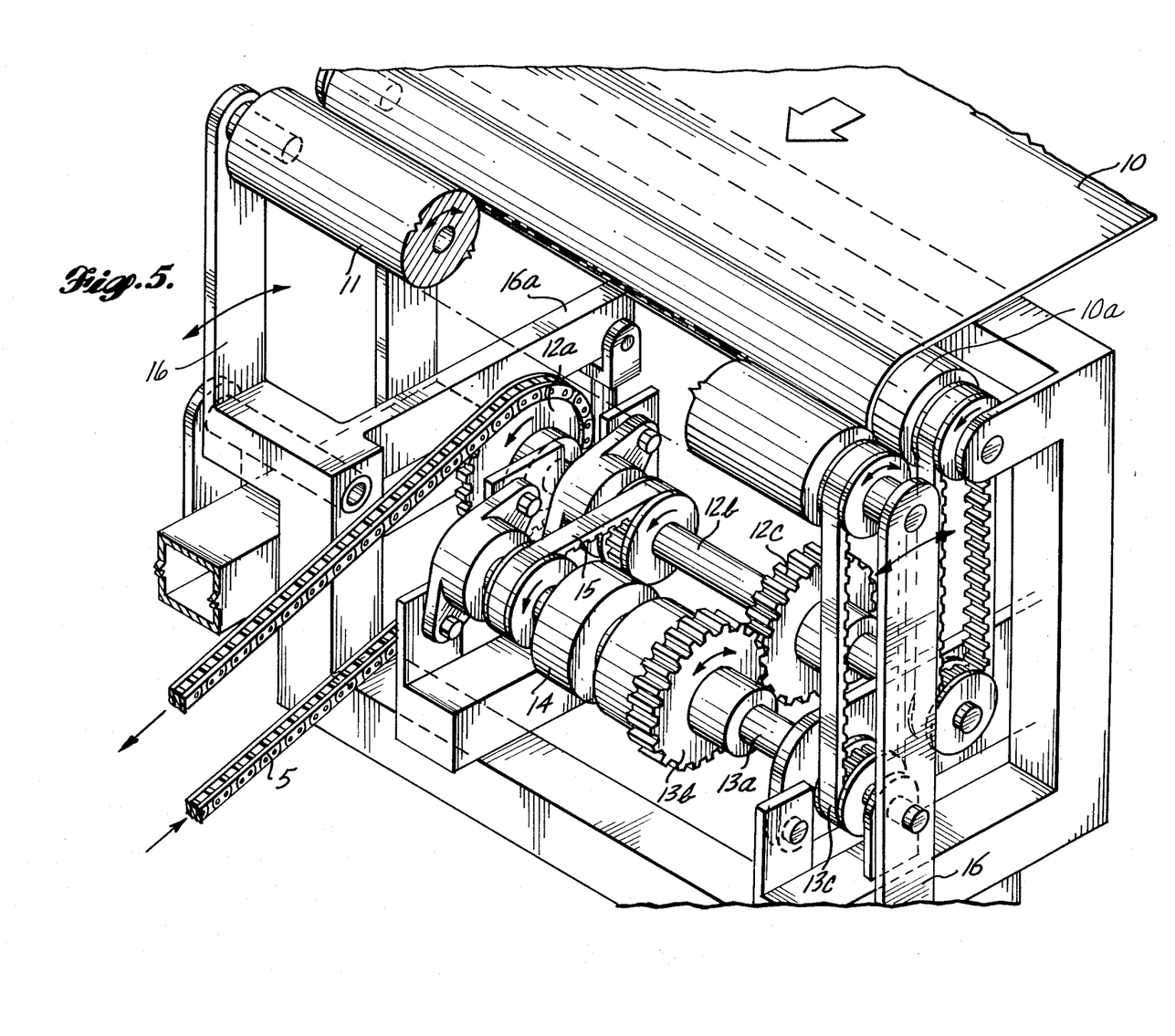
FIG. 5 is a top perspective of the folding roller section of the apparatus, parts being broken away.

The folding roller rotation reversal and shifting is preferably accomplished by the folding roller control mechanism best shown in FIG. 5. The folding roller 11 is rotated in the same direction as the first conveyor drive roller by main drive chain 5 through first conveyor sprocket 12a which is mounted on one end of shaft 12b. Spur gear 12c, mounted on the opposite end of shaft 12b, drives spline shaft 13a through spur gear 13b. Spline shaft 13a drives the folding roller through folding roller drive belt 13c. To reverse the rotation of the folding roller, the folding roller clutch 14 is engaged by operation of the timer triggered by the electric eye 18 sensing passage of the trailing edge of a tortilla, disengaging the spur gears 12c and 13b and shifting the spline shaft 13a to the left in FIG. 5. The folding roller is then driven by the main drive chain 5 through sprocket 12a and shaft 12b which drives clutch 14 through belt 15. Since spur gears 12c and 13b are disengaged and clutch 14 is engaged, spline shaft 13a is rotated in the opposite direction, driving folding roller drive belt 13c and folding roller 11 in the opposite direction.

To shift the folding roller 11 away from its normal position adjacent to the first conveyor drive roller by operation of the timer triggered by the electric eye 18, the folding roller is carried by the upper ends of the upright arms of synchronized bell cranks 16 which swing about the axis of rotation of the spline shaft 13a. As most clearly shown in FIG. 6, one horizontal arm 16a of the bell cranks 16 is pivotally connected to the plunger 16b of pneumatic folding roller control jack 16c. To shift the folding roller away from its normal position closely adjacent to the first conveyor drive roller, the effective length of the control jack 16c is increased, swinging the bell cranks 16 about the axis of the spline shaft 13a and shifting the folding roller away from the first conveyor drive roller.

Since the consistency of the sheet wrapper dough can vary considerably, it is preferred to position the folding roller normally quite close to the discharge end of the first conveyor. If the dough is maintained at a uniform fairly stiff consistency, the folding roller could be mounted adjacent to the first conveyor with a gap of fixed width between the folding roller and the first conveyor. As the fairly stiff dough sheet is discharged from the conveyor, the leading portion would bridge the gap and be drawn up the surface of the folding roller. Then the folding roller would merely reverse direction forming the first fold as previously described without such folding roller being shifted away from the conveyor 1.

While the pastry folding machine of McDonald U.S. Pat. No. 1,981,875, discussed under the PRIOR ART heading, includes a pair of folding rollers to fold and crimp the McDonald crust, such rollers either continuously rotate in opposite directions or both rollers rotatively oscillate in synchronism. Although the folding roller of the present invention rotates alternately in opposite directions, the adjacent roller of conveyor 1 rotates constantly in one direction only.

Figure 6:
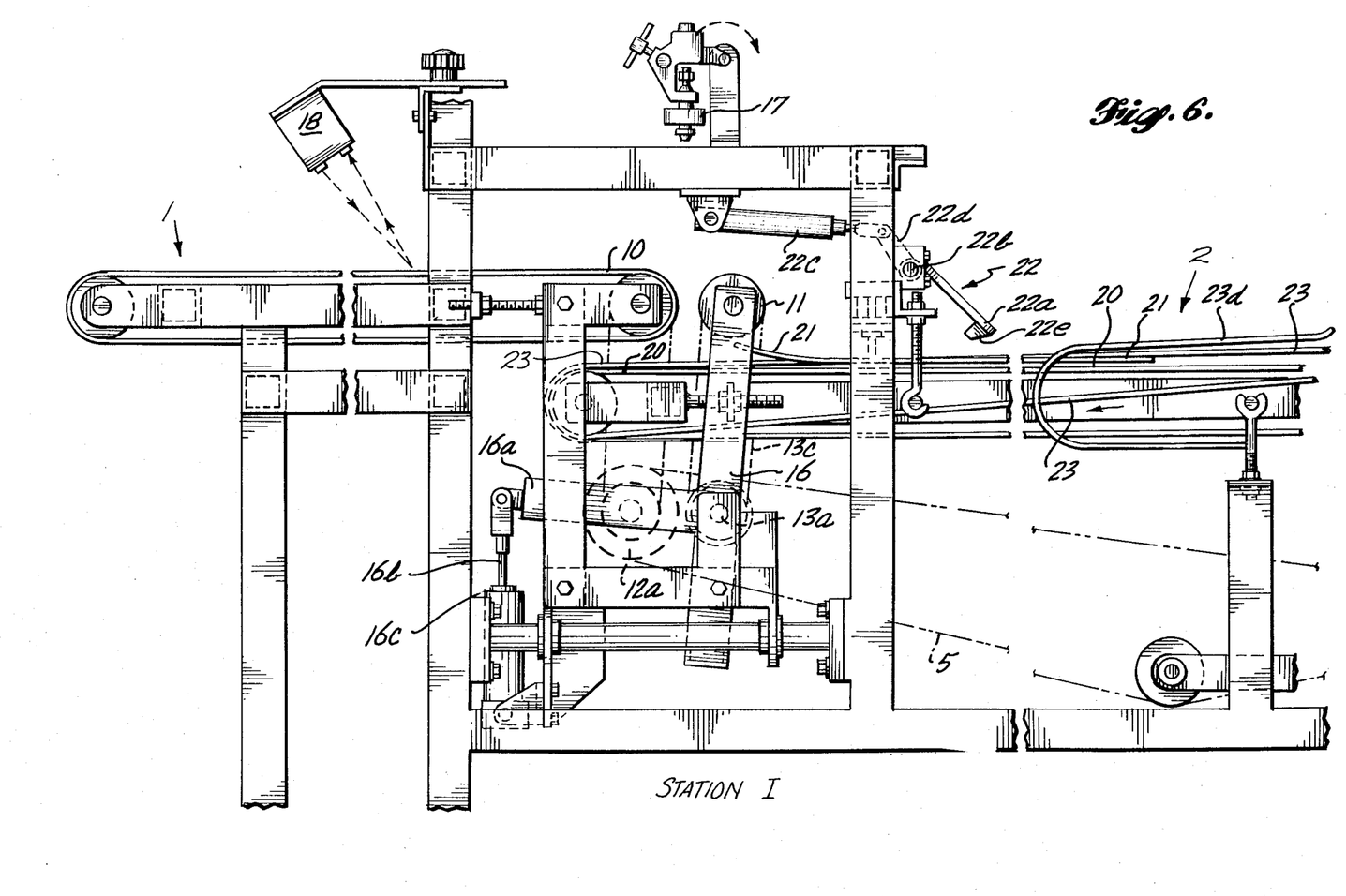
FIG. 6 is an elevation of the feed section of the apparatus, parts being broken away.

Also located at station I is a water spray gun 17 shown in FIG. 6, which is controlled by the folding roller timer and operates simultaneously with the reversal of the folding roller rotation. The water gun sprays a fine spray of water onto the upper surface of the tortilla as it is drawn through the gap between the folding roller and the first conveyor belt to moisten and glutinize such surface so that the portions of that surface which are brought into contact by the folding operation will adhere to each other.

At station II located at conveyor 2, the opposite side portions of the doubled tortilla are infolded transversely of the first fold onto the inner longitudinal portion of the doubled tortilla.

As best seen in FIG. 3, the tortilla is drawn through the gap between the rollers of station I onto the upper stretch 20 of conveyor 2. Since the fold of the doubled tortilla is the first portion to engage such upper stretch 20, such fold and the foodstuff above the fold are dragged forward to become the leading portion of the tortilla.

The entire length of the crease below the foodstuff does not always engage the upper stretch of the second conveyor simultaneously. If one end of the crease comes into contact with the moving conveyor belt before its opposite end, the conveyor belt tends to pull the lower end of the crease ahead of the opposite end, skewing the tortilla so that the crease is not perpendicular to the direction of conveyor movement. If the tortilla is skewed, the infolded folds will not be perpendicular to the first fold of the doubled tortilla. To position the tortilla so that the first fold or crease extends precisely perpendicular to the direction of movement of the second conveyor upper stretch, the rectangular plate 22a of a squaring gate 22 is held in a vertical position above such conveyor stretch by the folding roller timer until the entire length of the tortilla folded leading edge engages the squaring plate tortilla contact bar 22 carried by the swinging end of plate 22a. The plate is then swung up and out of the path of the tortilla in the direction of travel of upper stretch 20 of conveyor 2 about transverse shaft 22b mounted to the upper edge portion of the plate 22a. Such plate swinging is accomplished by shortening the effective length of the squaring gate control jack 22c, one end of which is connected to the plate 22a through bell crank 22d.

Figure 7:
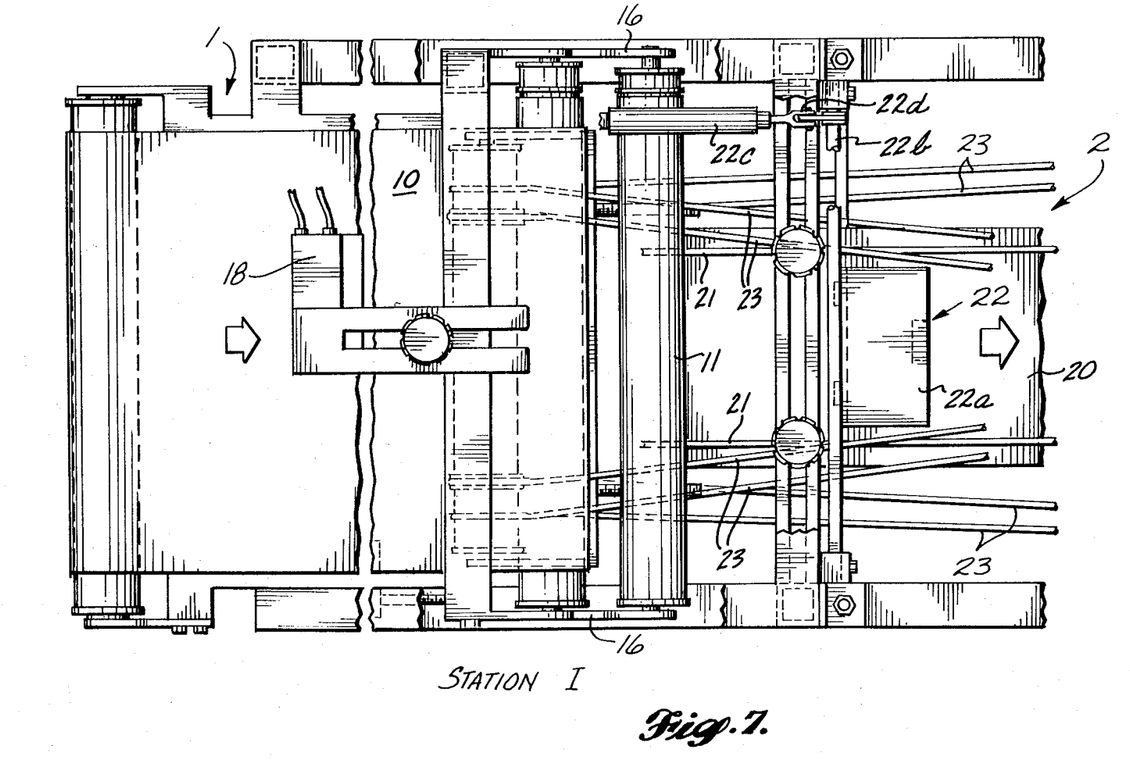
FIG. 7 is a plan of the feed section of the apparatus, parts being broken away.

As shown in FIGS. 6 and 7, during squaring of the doubled tortilla by squaring gate 22, the opposite side portions of the tortilla are held down by cantilever rods 21 which deter unfolding of the first fold made by the folding rollers of station I. The two spaced rods run parallel to the direction of travel of the second conveyor. Such rods can be mounted for adjustment of their spacing between 4 inches (10 cm) and 10 inches (25 cm) to accommodate tortillas of different sizes. The upstream end of each rod is disposed somewhat above the conveyor upper stretch and below the folding roller 11. From their upstream ends the rods slope downward toward the conveyor upper stretch to straight major rod horizontal portions parallel to and spaced above the upper stretch 20 of the second conveyor which terminate in downstream free ends.

Referring to FIGS. 2 and 3, as the tortilla is discharged from the folding rollers of station I, the opposite side portions of the doubled tortilla are laid onto the inner pair of two pairs of quarter belts which are driven by the second conveyor idler roller and therefore travel at approximately the same speed as the conveyor. As the leading portion of the tortilla is dragged forward by the upper stretch 20 of the second conveyor and the quarter belts 23, it is drawn under the upwardly curved feed end of the cantilever rods 21.

After the doubled tortilla is transported by the upper stretch of the second conveyor 2 past the squaring gate 22 and under the horizontal portions of the cantilever rods 21, the opposite side portions of the tortilla are progressively folded inwardly over the rods 21, constituting fold-locating means, by the inner pair of quarter belts 23. The belts diverge elevationally from the upper stretch 20 of the conveyor and converge laterally from the opposite edges of the second conveyor belt upper stretch toward station III as shown in FIG. 3 so that the tortilla side portions are lifted and folded inward around the cantilever rods 21. To reduce the distance between the downstream ends of the two quarter belt upper stretches, the belts are guided around fingers 23b shown in FIG. 10 that are adjacent to the quarter belt idler pulleys 23a which are mounted horizontally above and beyond the discharge end of the second conveyor with their inner edge portions adjacent to the conveyor center line. The outer pair of quarter belts, the upper stretches of which run parallel to the inner quarter belts and are spaced downstream from the inner quarter belts, are provided to maintain the infolds made by the inner pair of quarter belts, particularly the infolds of smaller diameter tortillas, until the infolded tortilla is slid off the free straight ends of the cantilever rods 21 as it is transported by conveyor 2. As best shown in FIGS. 6 and 7, the portions of the outer quarter belts adjacent to the discharge portions of the cantilever rods are spaced slightly above the rods and cross from adjacent to the outer side of the respective rod to a location adjacent to the inner side of the respective rod. Therefore, if the infolded portions of the smaller tortillas are not wide enough to remain under the inner pair of quarter belts, they will be held down by the outer pair of quarter belts until the tortilla is slid off the cantilevered rods.

Figure 10:
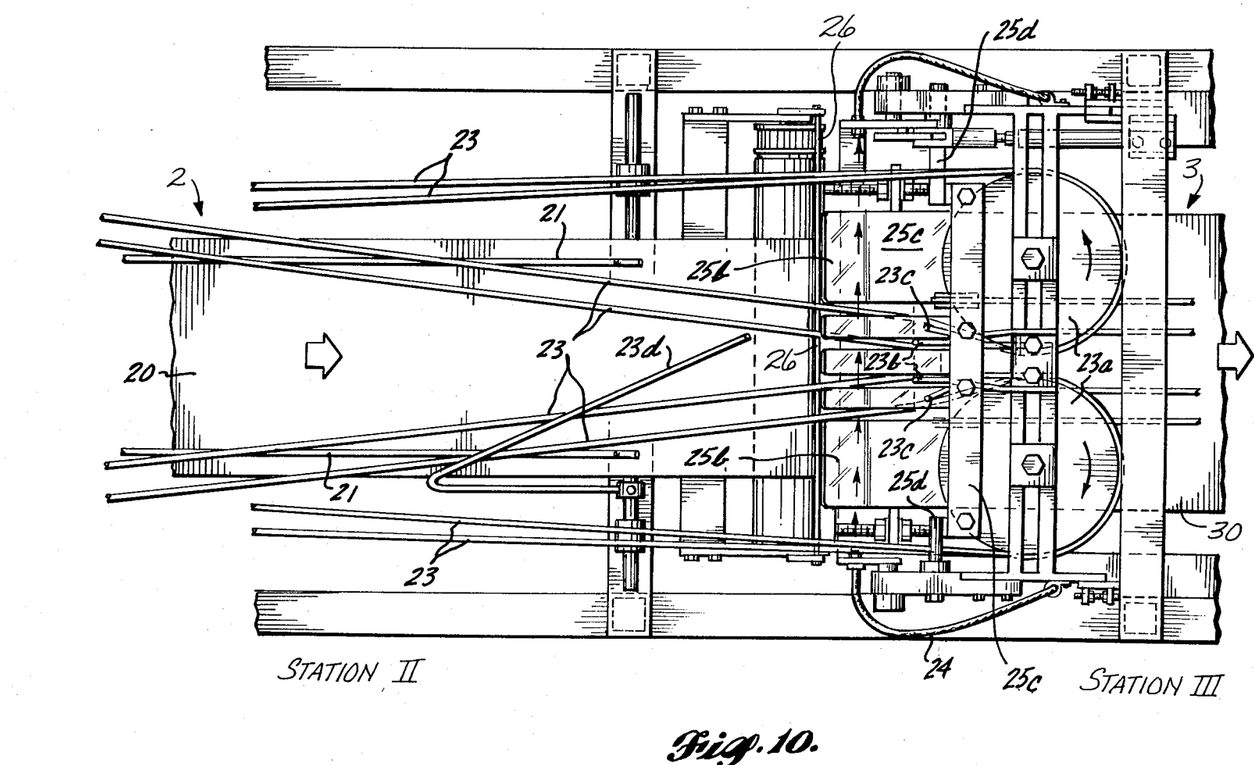
FIG. 10 is a plan of the midsection of the apparatus, parts being broken away.

The larger diameter tortillas are laid on the first conveyor with one edge aligned with one edge of the conveyor belt. Therefore, the opposite edge portion of the tortilla may overhang the opposite edge of the conveyor belt and, owing to the weight of the side portion to be infolded, the inner quarter belt may not fold it over the cantilever rod. To ensure the folding of the larger side portion, a generally U-shaped infold rod 23d, shown in FIGS. 6 and 10, is mounted on the corresponding side of the second conveyor. The legs of the infold rod are downstream from the base with the lower leg running generally parallel to the direction of conveyor travel, adjacent to the lower return stretch of the second conveyor. The upper leg is generally horizontal and runs from the edge of the second conveyor belt downstream from the pont where the inner quarter belt crosses the cantilever rod to a point on the opposite side of the conveyor center line downstream of the discharge end of the cantilever rod, so that the infold rod crosses the cantilever rod slightly above the quarter belts just upstream from where the outer quarter belt crosses the cantilever rod as shown in FIG. 10. Therefore, if the inner quarter belt does not fold the tortilla outer portion over the cantilever rod, the outer portion will ride up the base of the infold rod and be lifted over the cantilever rod by the infold rod upper leg.

Rather than infolding the opposite edge portions of the larger tortillas so that the opposite folds were parallel, it was found that the opposite folds tended to flare outward slightly from the folded leading edge. To overcome this problem, a ledge 22e is mounted to the upstream side of the rectangular plate 22a of the squaring gate at its lower edge extending about 1 inch (2.5 cm) on either side of the center line and protruding about ½ inch (1.3 cm). As the folded leading edge of the doubled tortilla strikes the squaring gate, the leading edge is dented by the ledge 22e. Then as the doubled tortilla is infolded by the quarter belts, the leading edge is straightened, removing the dent and eliminating the flare.

When the tortilla reaches the discharge end of the second conveyor 2 after the opposite side portions of the tortilla have been infolded, the doubled leading portion of the tortilla is folded back onto the trailing portion of the tortilla about a second fold extending transversely of the infolding folds and the direction of movement of the tortilla and behind the foodstuff filling. Such folding operation is accomplished at station III by the folder shown somewhat diagrammatically in FIGS. 8A, 8B and 8C.

Figure 8A:
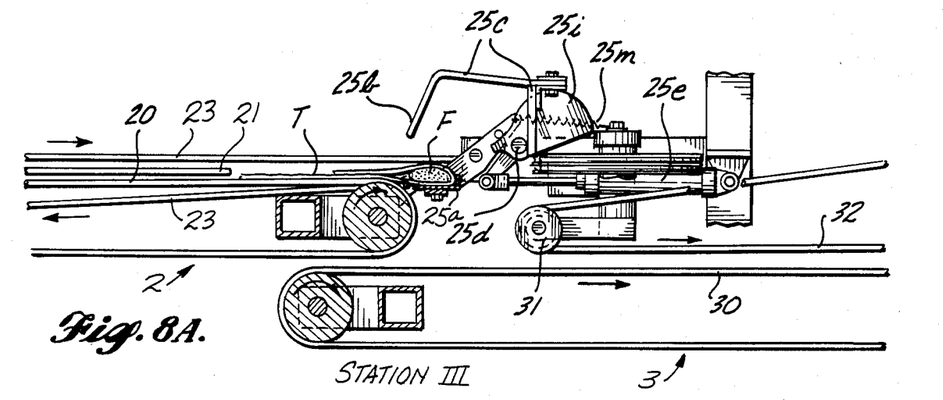
FIGS. 8A, 8B and 8C are diagrammatic elevations showing the operation of a blade folder of the apparatus.

The second transverse fold is made by the free end of a hooked folder 25 which swings about an axis extending transversely of conveyor 2 and beyond its discharge end a distance such that the free end of the folder traverses an arc slightly beyond the discharge end of conveyor 2. Moreover, such axis is located somewhat above the upper stretch of conveyor 2 so that, as the free end of the folder passes the end of conveyor 2, a substantial component of its movement will be in the direction of travel of conveyor 2 in addition to the downward component of folder movement. During the folding operation, the folder swings through an angle of approximately 110 degrees from a position in which the free edge of the hooked folder is located higher than the upper stretch of conveyor 2, as shown in FIG. 8A, to the depending position of FIG. 8C in which the free edge of the hooked folder is substantially directly beneath the axis of swing of the folder. During such motion, the free edge of the hook engages the tortilla at the trailing side of the foodstuff filling, as shown in FIG. 8B and, during the remainder of the folder swing, the hooked folder scoops the doubled leading portion of the tortilla containing the filling so that it is on the upper side of the folder when it reaches its lower limiting position of swing shown in FIG. 8C.

Figure 8B:
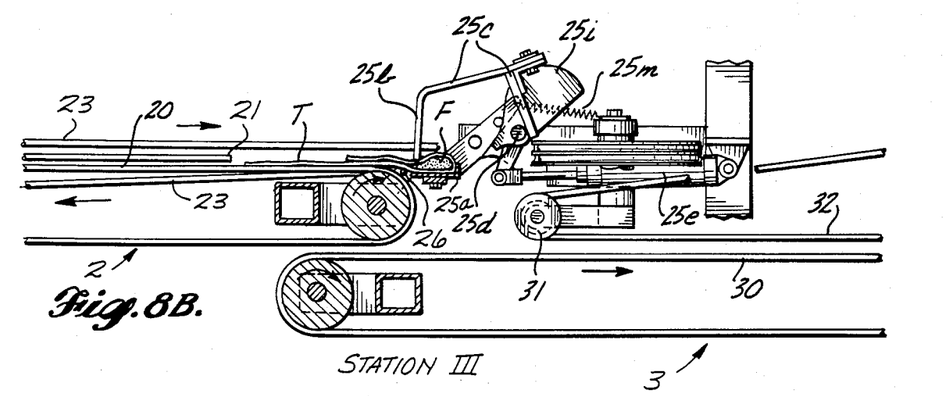
Figure 11:
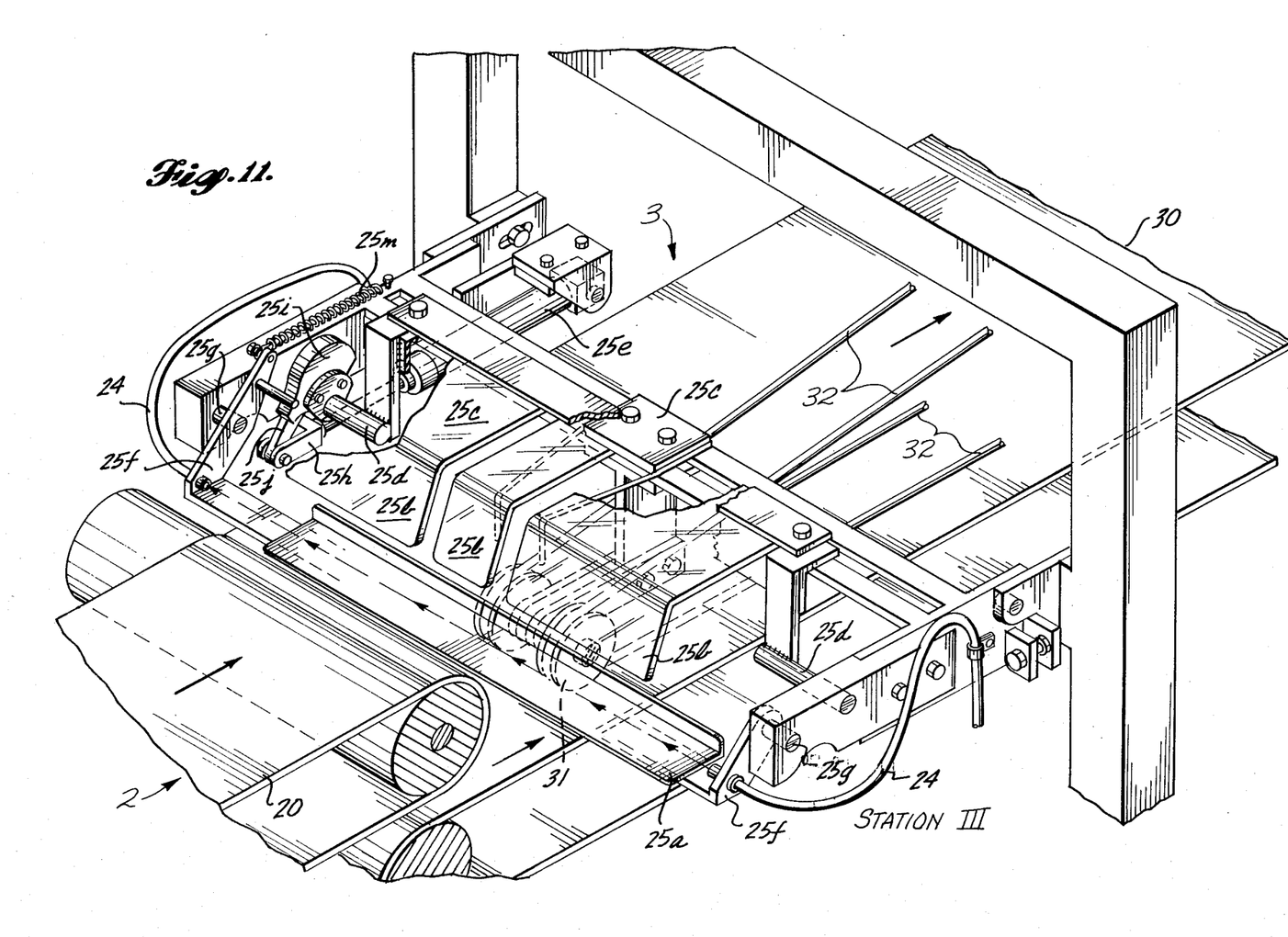
FIG. 11 is a top perspective of a portion of the apparatus, parts being broken away, showing the blade folder.
Figure 12:
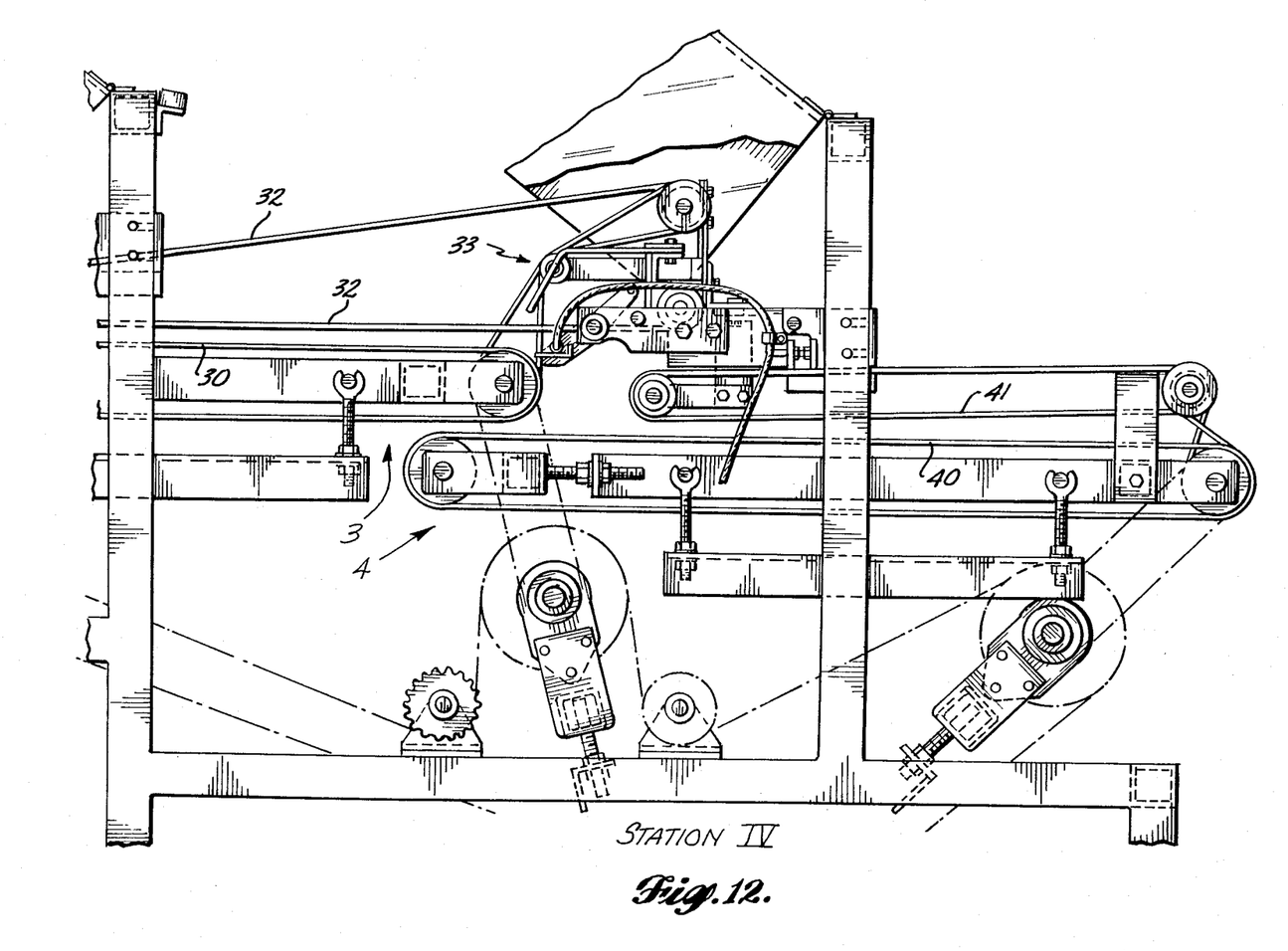
FIG. 12 is an elevation of the discharge section of the apparatus, parts being broken away.
Figure 13:
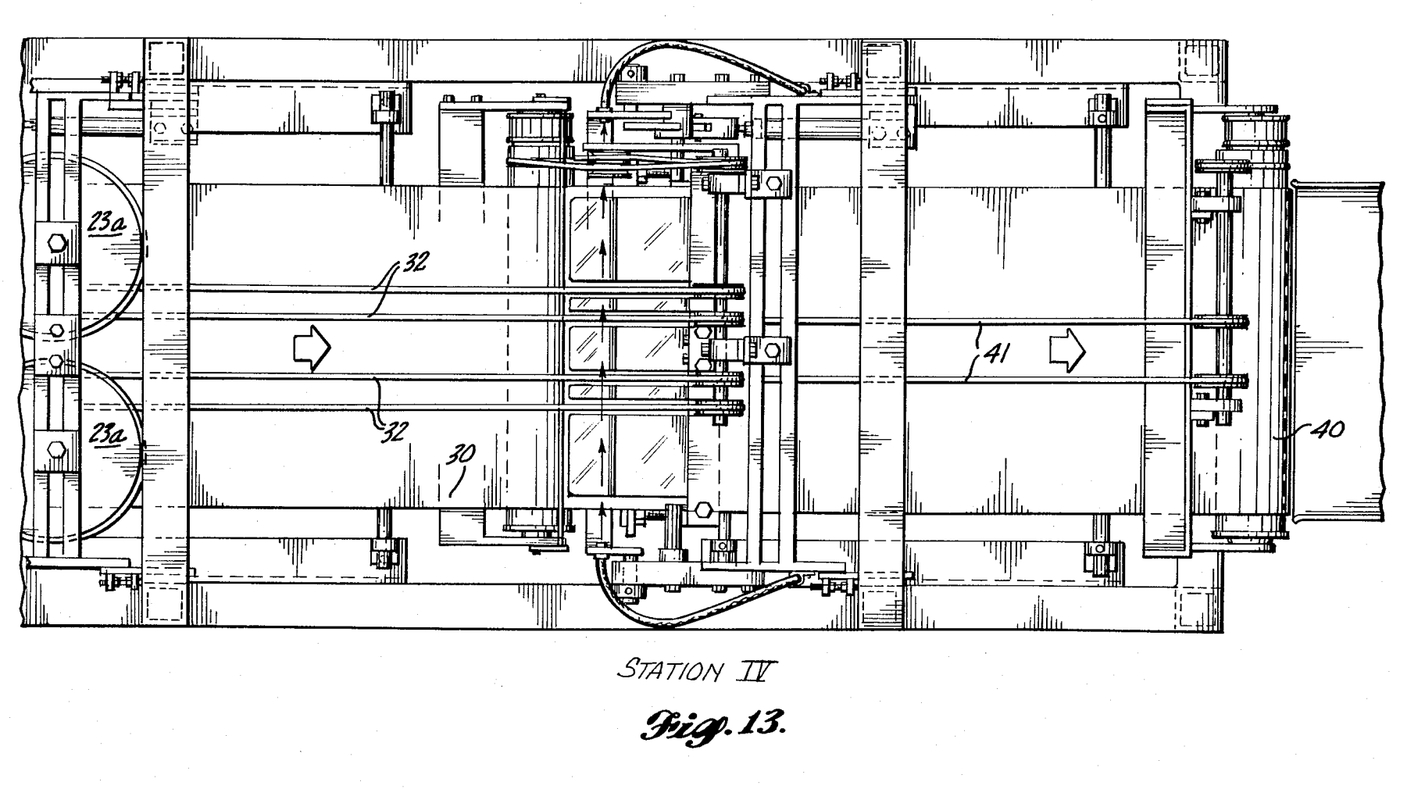
FIG. 13 is a plan of the discharge section of the apparatus, parts being broken away.

In order to enable the folder to engage the tortilla behind the foodstuff filling, as shown in FIG. 8B, the doubled leading portion of the tortilla must be supported temporarily beyond the discharge end of conveyor 2. Such temporary support is effected by a temporary support plate 25a mounted for disposition immediately beyond the discharge end of conveyor 2 and substantially coplanar with the upper stretch of such conveyor, as shown in FIGS. 8A and 8B. Such support plate is approximately 2½ inches (7 cm) wide in the direction of conveyor travel and about 11½ inches (29 cm) long transversely of the conveyor, as shown in FIG. 11.

Movement of the conveyor 2 slides the doubled leading portion of the tortilla onto the temporary support plate 25a breaking the beam of electric eye 24 which effects downward swinging of folder blade 25b and withdrawal of temporary support plate 25a. The folder blade is carried by arm 25c which is swingably mounted by shaft 25d having an axis extending transversely of the direction of movement of the upper stretch of conveyor 2 and which arm extends generally radially of such axis. The temporary support plate 25a extends between and is carried by arms 25f extending downwardly and rearwardly from shaft 25g when plate 25a is in its raised position. Shaft 25g extends transversely of the direction of movement of the upper stretch of conveyor 2 and is located between such conveyor and the folder support shaft 25d. The folder 25 and the temporary support plate 25a are operatively interconnected to swing conjointly about their respective pivot axes. Conjoint swinging of the folder and support plate 25a is effected by pneumatic control jack 25e shown in FIGS. 8A, 8B and 8C as being operatively connected between the frame of the apparatus and the folder 25 and support plate.

Figure 8C:
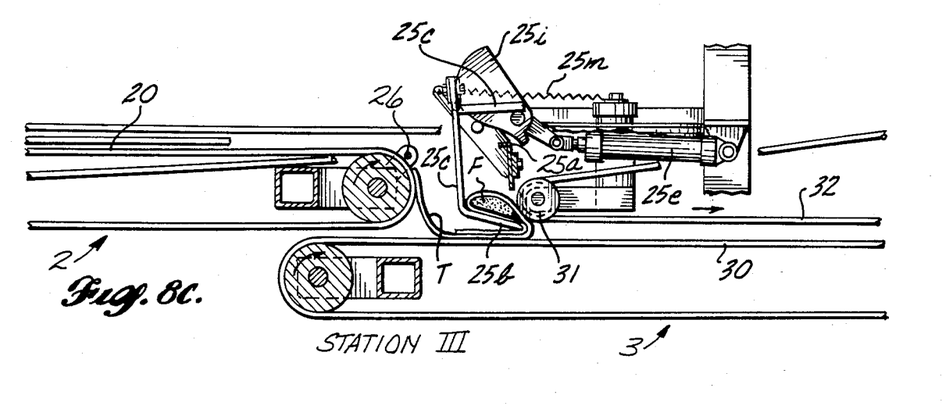

The piston rod of pneumatic jack 25e is connected to an actuating arm 25j of the folder. The folder carries a cam 25i engageable with a cam follower pin 25k projecting laterally from the side of an arm 25f supporting the temporary support plate 25a. A tension spring 25m connects such arm to the frame to hold the follower pin continually in contact with the cam 25i.

The cam 25i is shaped so that during the initial contraction of the control jack 25e from the position shown in FIG. 8A to the position shown in FIG. 8B, the folder 25 will be swung downward so that its free edge will engage the tortilla behind the foodstuff filling while the temporary support plate 25a is not moved relative to the conveyor 2. During the next increment of control jack contraction, the folder 25 and temporary support plate 25a will be swung conjointly downward around their respective pivots with the tortilla clamped between the free edge of the folder and the temporary support plate. During such movement, the balance of the tortilla moves down around the roller supporting the discharge end of the conveyor belt 2. Preferably, the speed of contraction of jack 25e is synchronized with the speed of movement of the conveyor 2 so that the tortilla will not be dragged along the belt but will be moved at the same speed as the belt.

As the folder 25 approaches its lowermost position shown in FIG. 8C where it has scooped the leading portion of the tortilla enclosing the foodstuff filling onto its upper side, the cam 25i will accelerate swinging of the control arm 25f beyond its upright position to raise the temporary support plate above the tortilla.

Swinging of the folder 25 to approach its lowest position will lay the overlaping portions of the tortilla beneath its blade on the upper stretch of the third belt conveyor 30. A pulley 31 at the upstream end of hold-down belts 32 spaced closely above the upper stretch 30 of belt 3 is located close to the lowermost position of the folder blade 25b. In the lowest position of such blade, its free edge will tuck the second transverse fold of the tortilla into the gap between the upper stretch 30 of conveyor 3 and the pulley 31 at the entering end of the hold-down belts 32. The clamping action effected by the cooperation of the upper belt stretch 30 and the hold-down belts 32 will draw the further folded tortilla off the blade 25b of the folder 25a. The folder thus stripped of the tortilla can then be swung reversely upward by extension of the control jack 25e to position the folder as shown in FIG. 8A for engagement with the next tortilla. Because spring 25m has held the cam follower pin 25k against cam 25i, the supporting arm 25f of the temporary support plate 25a will also be swung upward to restore such temporary support plate to a position substantially coplanar with the upper stretch of conveyor 2, as shown in FIGS. 8A and 8B.

The folding operation of the folder 25 and temporary support plate 25a described above, is initiated by the leading edge of a tortilla reaching the discharge end of the second conveyor 2. As movement of such conveyor slides the folded leading edge of the tortilla onto the temporary support plate 25a, the tortilla breaks the beam of an electric eye 24 which energizes the folder control jack 25e to swing the folder and temporary support plate in the manner described. Preferably, the support plate 25a has a flange projecting upwardly from its edge remote from conveyor 2 which is engaged by the leading edge of the tortilla as it is pushed onto the temporary support plate. The resulting buckling of the tortilla facilitates initiation of the second transverse fold by engagement of the free edge of the folder with the tortilla.

Supply of air under pressure to the cylinder of the double-acting control jack 25e is timed so that descent of the folder blade 25b and temporary support plate 25a is synchronized with movement of belt 2 around the roller at the discharge end of the second conveyor until the folder blade nears the hold-down belt pulley 31. The supply of air under pressure to the control jack is then interrupted so that the folder blade 25b dwells in its lower position until the cooperating upper stretch 30 of belt 3 and the hold-down belt pulley 31 strip the tortilla from the folder blade, whereupon air under pressure will be supplied to the other end of the control jack 25e to swing the folder blade reversely away from the tortilla and back up to its initial position shown in FIG. 8A.

Figure 9:
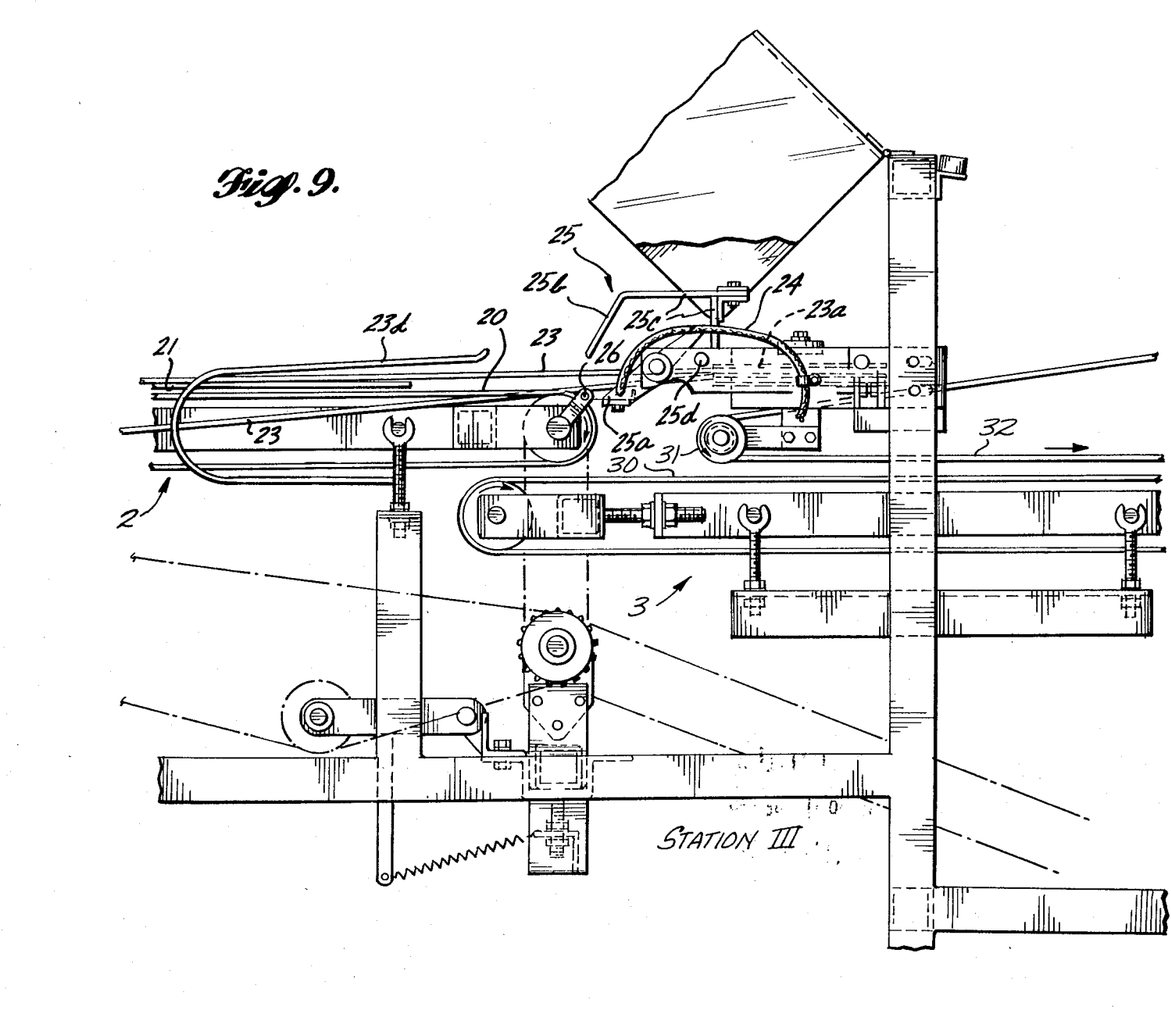
FIG. 9 is an elevation of the midsection of the apparatus, parts being broken away.

To insure that the trailing portion of the tortilla is stripped cleanly from the belt of conveyor 2 as the leading portion of the tortilla is pulled away from such conveyor by the cooperation of the folder blade 25b and the temporary support plate 25a, it may be desirable to provide a stripper rod 26 shown in FIGS. 9 and 10 mounted adjacent to the roller at the discharge end of conveyor 2 and extending transversely of the direction of movement of the conveyor belt. The stripper rod also creates a slight drag on the trailing portion of the tortilla so that it will be stretched smoothly along the upper stretch 30 of conveyor belt 3 instead of falling from the discharge end of the conveyor 2 in folds.

Since, as can be seen best in FIGS. 8B, 8C and 9, the blade 25b oscillates through the upper stretches of the quarter belts 23, the blade includes a plurality of spaced blade members. The gaps between the blade members are aligned with the paths of the quarter belts, as best shown in FIG. 10. Since the belts are made of polyurethane, the blade is made of FDA approved plastic and the guide fingers are stainless steel, the quarter belts may rub along the edges of the blade members and the guide fingers without creating a problem.

After the leading portion of the tortilla is folded over onto the trailing portion by the blade folder 25 at station III, it is transported by the third conveyor 3 to station IV while being held down by hold-down belts 32. These belts, which run parallel to the direction of conveyor movement and are spaced above the upper stretch 30 of the conveyor, travel at the same speed as the upper stretch of the third conveyor. It has been found to be desirable to use four spaced hold-down belts so that the outer pair of belts are spaced closer than the inner belt to belt 30 to hold down the outer corners of the folded tortilla.

When the tortilla reaches the discharge portion of the third conveyor, the leading portion of the tortilla is again turned over onto the trailing portion by hooked folder 33 in a manner similar to that described with reference to folder 25 at the discharge end of conveyor 2 and is deposited on the upper stretch 40 of the fourth conveyor beneath the hold-down belts 41.

The process of making a burrito having both of its opposite end portions infolded has been described. To form a burrito with one or both ends open, all that is necessary is to remove one set of quarter belts on one side of the center line or remove all of the quarter belts.

Enchiladas and taquitos may be formed in the same manner as the open-ended burritos. However, enchiladas and taquitos are more properly rolled rather than folded. To roll the doubled tortilla an initial fold or roll is made by the first blade folder 25 and the tortilla is deposited on the upper stretch 30 of the third conveyor beneath the hold-down belts 32 but the speed of travel of the hold-down belts is maintained somewhat less than the speed of the upper stretch 30. Therefore, the relative movement of the upper stretch and the hold-down belts roll the tortilla as it is transported by the upper stretch. Owing to the increasing size of the product as it is rolled, it may be necessary to increase the space between the hold-down belts and the upper stretch 30 progressively so that the distance between the belts and the stretch is greater at the discharge end than at the feed end. For making such a rolled product, the blade folder 33 and fourth conveyor would be omitted.

We claim:

1. In mechanism for folding a sheet wrapper around filling including generally horizontal conveyor means for transporting a sheet wrapper edgewise and having a discharge end roller rotatable about an axis extending transversely of the direction of movement of the conveyor means and means for rotating such discharge end roller continuously in one direction, the improvement comprising an auxiliary roller adjacent to and beyond the discharge end of the conveyor means, having its upper surface disposed at substantially the same elevation as the elevation of the discharge end of the conveyor means and rotatable about an axis substantially parallel to the axis of rotation of the conveyor discharge end roller, reversible drive means for driving said auxiliary roller alternatively in opposite directions, and control means for controlling said reversible drive means to drive said auxiliary roller in the same rotative direction as the conveyor discharge end roller rotation until a substantial portion of a wrapper delivered by the conveyor means has been transferred from the conveyor means onto said auxiliary roller, and for then reversing the direction of rotation of said reversible drive means for driving said auxiliary roller in the rotative direction opposite the direction of rotation of the conveyor discharge end roller for folding the wrapper between the conveyor discharge end roller and said auxiliary roller along a crease extending transversely of the direction of movement of the conveyor means and drawing the wrapper and filling downward between such rollers in that folded condition, and said control means thereafter being operable to reverse the direction of rotation of said auxiliary roller to rotate again in the same direction as the direction of rotation of the conveyor discharge end roller to receive thereon the leading portion of the next sheet wrapper delivered by the conveyor means.

2. In the mechanism defined in claim 1, means supporting the auxiliary roller for shifting toward and away from the conveyor discharge end roller, and means for effecting shifting of said supporting means to move the auxiliary roller away from the conveyor discharge end roller when the direction of rotation of the auxiliary roller is reversed to the direction opposite the direction of rotation of the conveyor discharge end roller.

3. In the mechanism defined in claim 1, the sheet wrapper being a tortilla, and water spray means located adjacent to the discharge end of the conveyor means for directing a spray of water onto the upper surface of a tortilla overlying the conveyor discharge end roller and the auxiliary roller, and spray control means coordinated with the control means for controlling the reversible drive means for effecting spray discharging operation of the spray means when the control means for controlling the reversible drive means reverses the direction of rotation of the reversible drive means for driving the auxiliary roller in the rotative direction opposite the direction of rotation of the conveyor discharge end roller.

4. In the mechanism defined in claim 1, second conveyor means below the conveyor discharge end roller and the auxiliary roller traveling in substantially the same direction as the generally horizontal conveyor means for receiving a filled sheet wrapper drawn downward between the conveyor discharge end roller and the auxiliary roller, and squaring means overlying said second conveyor means and engageable by the filled wrapper for orienting the crease of the folded wrapper perpendicular to the direction of movement of said second conveyor means.

5. In the mechanism defined in claim 4, the squaring means including a contact member extending transversely of the direction of movement of the second conveyor means, and pivot means supported above the second conveyor means and mounting the contact member for swinging about an axis extending transversely of the direction of movement of the second conveyor means.

6. In the mechanism defined in claim 1, second conveyor means below the conveyor discharge end roller and the auxiliary roller traveling in substantially the same direction as the generally horizontal conveyor means for receiving a filled sheet wrapper drawn downward between the conveyor discharge end roller and the auxiliary roller, and fold-locating means overlying the second conveyor means and the filled wrapper carried by the second conveyor means and extending lengthwise of the second conveyor means generally parallel to the direction of movement of the second conveyor means, folding belts extending along opposite sides of said second conveyor means, respectively, for receiving side portions of the filled wrapper thereon, converging in the direction of movement of said second conveyor means and overlying said fold-locating means for lifting such opposite side portions of the wrapper and laying such lifted side portions over said fold-locating means and the central portion of the wrapper carried by said second conveyor means during transport of the filled wrapper by said second conveyor means, and folding belt drive means for driving said folding belts in the same direction as the direction of movement of said second conveyor means and at substantially the same speed as the speed of said second conveyor means.

7. In the mechanism defined in claim 1, second conveyor means below the conveyor discharge end roller and the auxiliary roller traveling in substantially the same direction as the generally horizontal conveyor means for receiving a filled sheet wrapper drawn downward between the conveyor discharge end roller and the auxiliary roller, blade means extending transversely of said second conveyor means, and support means supporting said blade means adjacent to the end of said second conveyor means for movement of said blade means edgewise into engagement with the filled wrapper for creasing the wrapper transversely of the direction of movement of said second conveyor means as the filled wrapper is discharged from said second conveyor means.

8. In the mechanism defined in claim 7, the support means includes an arm carrying the blade means, swingable about an axis extending transversely of the direction of movement of second conveyor means and extending generally radially of the axis of swing of said arm.

9. An infolder for folding a sheet wrapper around filling including conveyor means for transporting a sheet wrapper edgewise, the improvement comprising fold-locating means overlying the conveyor means and the filled wrapper carried by the conveyor means and extending lengthwise of the conveyor means generally parallel to the direction of movement of the conveyor means, folding belts extending along opposite sides of the conveyor means, respectively, for receiving side portions of the filled wrapper thereon, converging in the direction of movement of the conveyor means and overlying said fold-locating means for lifting such opposite side portions of the wrapper and laying such lifted side portions over said fold-locating means and the central portion of the wrapper carried by the conveyor means during transport of the filled wrapper by the conveyor means, and folding belt drive means for driving said folding belts in the same direction as the direction of movement of the conveyor means and at substantially the same speed as the speed of the conveyor means.

10. Transit mechanism for folding a sheet including first conveyor means for transporting a sheet edgewise and having a discharge end, the improvement comprising second conveyor means moving in the same direction and beyond the first conveyor means and located lower than the discharge end of the first conveyor means, support means located beyond the discharge end of the first conveyor means and higher than said second conveyor means for receiving and supporting the leading portion of a sheet which has been moved beyond the discharge end of the first conveyor means, transfer and folding plate means located between the first conveyor means discharge end and said second conveyor means and cooperating with said support means for receiving the leading portion of the sheet from said support means and folding it over a trailing portion of the sheet about a fold line extending transversely of the direction of movement of the sheet by the first conveyor means, and means guiding said transfer and folding plate means into a position generally parallel to and overlying said second conveyor means for laying the folded sheet onto said second conveyor means.

11. In a folder for folding a sheet including conveyor means for conveying the sheet edgewise and having a discharge end, the improvement comprising support means located beyond the discharge end of the conveyor means for supporting the leading portion of the sheet which has been moved beyond the discharge end of the conveyor means, moving means for moving said support means generally in the same direction in which the sheet was moved edgewise by the conveyor means and away from the discharge end of the conveyor means, folding means located between the discharge end of the conveyor means and said support means, and means for moving said folding means relative to said support means for folding the leading portion of the sheet over a trailing portion of the sheet as said folding means is being moved by said moving means.

12. In the folder defined in claim 11, separate pivot means mounting the support means and the folding means, respectively, for conjoint swinging away from the discharge end of the conveyor means about different parallel axes extending transversely of the direction of travel of the conveyor means.

13. In a folder for folding a sheet including conveyor means for conveying the sheet edgewise and having a discharge end, the improvement comprising support means located beyond the discharge end of the conveyor means and generally in continuation thereof for supporting the leading portion of the sheet which has been moved beyond the discharge end of the conveyor means, first mounting means supporting said support means for movement downward relative to the conveyor means, folding means located between the discharge end of the conveyor means and said support means, second mounting means mounting said folding means for movement downward relative to the conveyor means, and moving means for moving said support means and said folding means conjointly downward away from the discharge end of the conveyor means and for moving said folding means downward relative to said support means for transferring the leading portion of the sheet from said support means to a position folded over a trailing portion of the sheet supported by said folding means.

14. In the folder defined in claim 13, the support means including a first plate, the first mounting means supporting said first plate for turning from substantially horizontal position to upright position as it is moved by the moving means away from the discharge end of the conveyor means, the folding means including a second plate, and the second mounting means supporting said second plate for turning from generally upright position toward horizontal position as it is moved with said first plate by the moving means away from the discharge end of the conveyor means.

15. In a folder for folding a sheet including conveyor means for conveying the sheet edgewise and having a discharge end, the improvement comprising support and folding plate means located adjacent to and beyond the discharge end of the conveyor means, and plate support means supporting said support and folding plate means extending transversely of the conveyor means for movement first edgewise downward and pressing its lower edge into engagement with the portion of the sheet beyond the discharge end of the conveyor means for creasing the sheet transversely of the direction of movement of the conveyor means and then for continued downward movement into a position beneath a portion of the sheet discharged from the conveyor means discharge end for folding the sheet around said lower edge of said support and folding plate means.

16. In the folder defined in claim 15, pivot means mounting the plate-support means for swinging of the plate means about an axis extending transversely of the direction of travel of the conveyor means.

* * * * *